United States Patent
Liu et al.

(10) Patent No.: US 12,489,697 B2
(45) Date of Patent: Dec. 2, 2025

(54) METHOD AND APPARATUS FOR MONITORING LINK STATE BETWEEN NODES

(71) Applicant: ZHEJIANG LAB, Zhejiang (CN)

(72) Inventors: Xingyu Liu, Zhejiang (CN); Songsong Lin, Zhejiang (CN); Wenjiao Yang, Zhejiang (CN)

(73) Assignee: ZHEJIANG LAB, Zhejiang (CN)

( * ) Notice: Subject to any disclaimer, the term of this patent is extended or adjusted under 35 U.S.C. 154(b) by 0 days.

(21) Appl. No.: 18/245,338

(22) PCT Filed: Jan. 16, 2023

(86) PCT No.: PCT/CN2023/072342
§ 371 (c)(1),
(2) Date: Mar. 14, 2023

(87) PCT Pub. No.: WO2024/082471
PCT Pub. Date: Apr. 25, 2024

(65) Prior Publication Data
US 2024/0297836 A1    Sep. 5, 2024

(30) Foreign Application Priority Data
Oct. 21, 2022  (CN) .......... 202211290282.4

(51) Int. Cl.
*H04L 43/0811* (2022.01)
*H04L 12/42* (2006.01)

(52) U.S. Cl.
CPC .......... *H04L 43/0811* (2013.01); *H04L 12/42* (2013.01)

(58) Field of Classification Search
CPC ..... H04L 12/12; H04L 43/0811; H04L 43/10; H04L 43/103
See application file for complete search history.

(56) References Cited

U.S. PATENT DOCUMENTS

| 7,099,287 B1 * | 8/2006 | Oz .......... H04L 12/437 370/258 |
| 2010/0177699 A1 * | 7/2010 | Klefter ............... H04L 61/4552 370/328 |

(Continued)

FOREIGN PATENT DOCUMENTS

| CN | 101931569 A | 12/2010 |
| CN | 103684835 A | 3/2014 |

(Continued)

OTHER PUBLICATIONS

Jin, H., "Research on the Design of Core Ring Network Structure and Optimization System," Journal of Kuchang University, vol. 36, No. 2, Mar. 30, 2017, 4 pages.

(Continued)

Primary Examiner — Douglas B Blair
(74) Attorney, Agent, or Firm — McCoy Russell LLP

(57) ABSTRACT

The present disclosure discloses a method and apparatus for monitoring a link state between nodes. The method includes: determining, by a first node, whether to transmit a first diagnosis message to a second node based on a monitoring result of whether to receive message data transmitted by the second node for a first time duration; processing, by the second node, the received first diagnosis message and transmitting the processed second diagnosis message to a third node; processing, by the third node, the received second diagnosis message and transmitting the processed third diagnosis message to the second node; determining, by the second node, whether to transmit the third diagnosis message to the first node; and determining, by the first node, a link state between the first node and the second node based on a monitoring result of whether to receive the third diagnosis message for a second time duration.

12 Claims, 4 Drawing Sheets

(56) References Cited

U.S. PATENT DOCUMENTS

| | | | | |
|---|---|---|---|---|
| 2010/0226260 A1* | 9/2010 | Zinjuvadia | ............... | H04L 41/12 370/256 |
| 2010/0312878 A1* | 12/2010 | Vladescu | .......... | G06F 15/17337 709/227 |
| 2013/0155874 A1* | 6/2013 | Sha | ......................... | H04L 45/50 370/242 |
| 2013/0182591 A1* | 7/2013 | Maruyama | .......... | H04L 43/0888 370/252 |
| 2024/0048407 A1* | 2/2024 | Li | ........................... | H04L 45/02 |

FOREIGN PATENT DOCUMENTS

| | | |
|---|---|---|
| CN | 105763394 A | 7/2016 |
| CN | 106921568 A | 7/2017 |
| CN | 111371631 A | 7/2020 |
| CN | 111817940 A | 10/2020 |
| CN | 111988191 A | 11/2020 |
| CN | 115361312 A | 11/2022 |
| WO | 2012000243 A1 | 1/2012 |
| WO | 2018145560 A1 | 8/2018 |
| WO | 2021249639 A1 | 12/2021 |

OTHER PUBLICATIONS

ISA State Intellectual Property Office of the People's Republic of China, International Search Report Issued in Application No. PCT/CN2023/072342, Jul. 4, 2023, WIPO, 8 pages. (Submitted with Machine Translation).

ISA State Intellectual Property Office of the People's Republic of China, Written Opinion of the International Searching Authority Issued in Application No. PCT/CN2023/072342, Jul. 4, 2023, WIPO, 9 pages. (Submitted with Machine Translation).

* cited by examiner

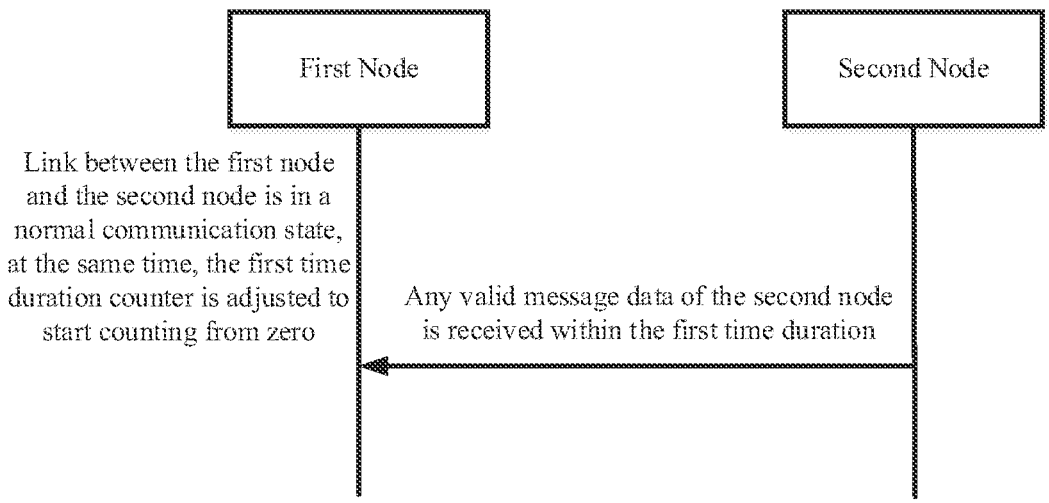
FIG. 3
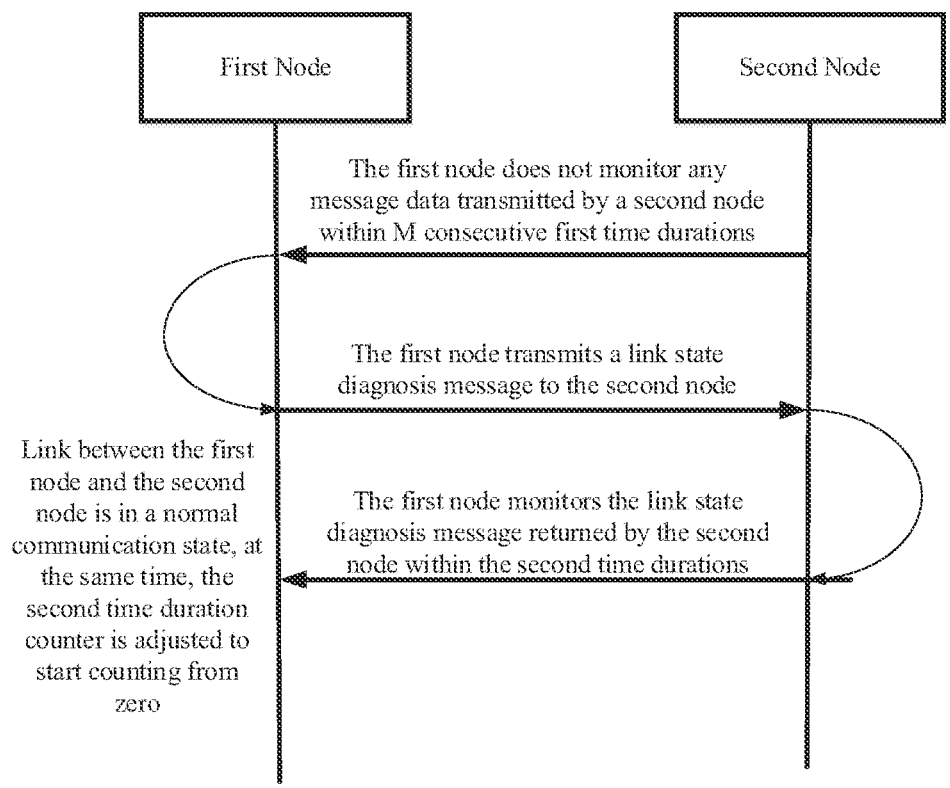
FIG. 4
| Command<br>CMD | Number of Ports<br>PORT_NUM | Transmission Direction<br>TRANS_FLAG |
|---|---|---|
| 1 Byte | 1 Byte | 1 Byte |
FIG. 5

METHOD AND APPARATUS FOR MONITORING LINK STATE BETWEEN NODES

CROSS REFERENCE TO RELATED APPLICATIONS

The present application is a U.S. National Phase of International Application No. PCT/CN2023/072342 entitled "METHOD AND APPARATUS FOR MONITORING LINK STATE BETWEEN NODES," and filed on Jan. 16, 2023. International Application No. PCT/CN2023/072342 claims priority to Chinese Patent Application No. 202211290282.4 filed on Oct. 21, 2022. The entire contents of each of the above-listed applications are hereby incorporated by reference for all purposes.

TECHNICAL FIELD

The present disclosure relates to the field of industrial control ring network technologies, in particular to a method and apparatus for monitoring a link state between nodes, and a computer readable storage medium.

BACKGROUND

At present, an industrial control network topology begins to use a ring network networking mode, which is mainly composed of a master station device and respective node devices connected in pairs through network cables or optical fibers. In order to ensure the reliability and real-time performance of a ring network system, it is necessary for the master station device in the ring network system to obtain a link state between nodes in real time, so as to realize the change of a control mode of the ring network system.

In order to monitor the link state between nodes in the ring network system in real time, there are two main methods at present. A first method is that the master station device actively transmits link diagnosis information to respective node devices in the ring network system, and determines the link state between nodes by analyzing the received link diagnosis information returned by the respective node devices. However, this method is not suitable for industrial scenes with relatively high real-time requirements, at the same time, since the master station device is a core of the ring network system and has complex functions, actively monitoring the link state between nodes of respective node devices in real time will increase the functional load of the master station device, thereby reducing the reliability of the ring network system. The second method is that respective node devices regularly transmit heartbeat messages to adjacent node devices, and determine whether the link state between two node devices is normal according to the heartbeat messages which are returned by the adjacent node devices and received for a certain period of time. However, in the case of a relatively large amount of data and a relatively high bandwidth load in the ring network link, this method obviously aggravates the link load, reduces the reliability of link state monitoring, easily causes false alarms. At the same time, a control processor of each of the existing respective node devices uses a parallel processor such as a field programmable gate array (FPGA), since different functional processing logics are in a parallel state, and the logic for processing the heartbeat messages is relatively simple and is not easy to be abnormal, while a real main processing logic is prone to be abnormal, there will be a situation that the heartbeat messages can interact normally and the main processing logic of the node device is abnormal, resulting in that the node status cannot be truly obtained by using this method.

SUMMARY

The objective of the present disclosure is to provide a method and apparatus for monitoring a link state between nodes and a computer readable storage medium to overcome the defects in the related art.

Embodiments of the present disclosure provides a method for monitoring a link state between nodes, being applicable to a ring network system, wherein the ring network system includes a first node, a second node and a third node which are sequentially connected, the method including: by the first node, monitoring whether message data transmitted by the second node is received for a first time duration to obtain a monitoring result, and determining whether to transmit a first diagnosis message to the second node based on the monitoring result; by the second node, after receiving the first diagnosis message, processing the first diagnosis message to obtain a second diagnosis message, and transmitting the second diagnosis message to the third node; by the third node, after receiving the second diagnosis message, processing the second diagnosis message to obtain a third diagnosis message, and transmitting the third diagnosis message to the second node; by the second node, after receiving the third diagnosis message, determining a validity of the third diagnosis message to obtain a determining result, and determining whether to transmit the third diagnosis message to the first node based on the determining result; and by the first node, monitoring whether the third diagnosis message transmitted by the second node is received for a second time duration to obtain a monitoring result, and determining a link state between the first node and the second node based on the monitoring result.

In some embodiments, by the first node, monitoring whether message data transmitted by the second node is received for the first time duration includes: by the first node, in response to receiving message data for the first time duration, processing the message data and determining that the link state between the first node and the second node is normal; and in response to not receiving the message data for the first time duration, cumulatively calculating, by the first node, a first number of times that none message data is received.

In some embodiments, determining whether to transmit the first diagnosis message to the second node based on the monitoring result includes: determining, by the first node, whether the first number of times exceeds a first threshold; in response to the first number of times not exceeding the first threshold, continuously monitoring, by the first node, whether message data transmitted by the second node is received for the first time duration; and in response to the first number of times exceeding the first threshold, transmitting, by the first node, the first diagnosis message to the second node.

In some embodiments, the first diagnosis message at least includes a message command, a number of network ports for message passing through and a message transmission direction.

In some embodiments, by the second node, after receiving the first diagnosis message, processing the first diagnosis message to obtain the second diagnosis message, and transmitting the second diagnosis message to the third node includes: after receiving the first diagnosis message, determining, by the second node, whether the first diagnosis message is a link state diagnosis message based on the message command; in response to the first diagnosis message being the link state diagnosis message, determining, by the second node, whether the number of network ports for message passing through is 0 and whether the message transmission direction is 1; by the second node, in response to that the number of network ports for message passing through is 0 and the message transmission direction is 1, adding 1 to the number of network ports for message passing through, and keeping the message transmission direction at 1; and by the second node, repackaging the first diagnosis message to obtain the second diagnosis message, and transmitting the second diagnosis message to the third node.

In some embodiments, by the third node, after receiving the second diagnosis message, processing the second diagnosis message to obtain the third diagnosis message, and transmitting the third diagnosis message to the second node includes: after receiving the second diagnosis message, determining, by the third node, whether the second diagnosis message is a link state diagnosis message based on the message command; in response to the second diagnosis message being the link state diagnosis message, determining, by the third node, whether the number of network ports for message passing through is 1 and whether the message transmission direction is 1; by the third node, in response to that the number of network ports for message passing through is 1 and the message transmission direction is 1, adding 1 to the number of network ports for message passing through, and setting the message transmission direction to 0; and by the third node, repackaging the second diagnosis message to obtain the third diagnosis message, and transmitting the third diagnosis message to the second node.

In some embodiments, by the second node, after receiving the third diagnosis message, determining the validity of the third diagnosis message, and determining whether to transmit the third diagnosis message to the first node based on the determining result includes: after receiving the third diagnosis message, determining, by the second node, whether the third diagnosis message is a link state diagnosis message based on the message command; in response to the third diagnosis message being the link state diagnosis message, determining, by the second node, whether the number of network ports for message passing through is 2 and whether the message transmission direction is 0; and in response to that the number of network ports for message passing through is 2 and the message transmission direction is 0, determining, by the second node, the third diagnosis message is valid, and transmitting the third diagnosis message to the first node.

In some embodiments, by the first node, monitoring whether the third diagnosis message transmitted by the second node is received for the second time duration, and determining the link state between the first node and the second node based on the monitoring result includes: in response to receiving the third diagnosis message for the second time duration, determining, by the first node, that the link state between the first node and the second node is normal; and by the first node, in response to not receiving the third diagnosis message for the second time duration, cumulatively calculating a second number of times that none third diagnosis message is received, and determining the link state between the first node and the second node based on the second number of times.

In some embodiments, determining the link state between the first node and the second node based on the second number of times includes: determining, by the first node, whether the second number of times exceeds a second threshold; in response to the second number of times not exceeding the second threshold, transmitting, by the first node, the first diagnosis message to the second node; and in response to the second number of times exceeding the second threshold, determining, by the first node, that the link state between the first node and the second node is abnormal.

In some embodiments, the message data includes any valid network data.

In some embodiments, the second time duration is a time period from the first node transmitting the first diagnosis message until to the first node receiving the third diagnosis message.

The embodiments of the present disclosure provides an apparatus for monitoring a link state between nodes, wherein the apparatus includes a memory and one or more processors, wherein the memory stores executable codes, and when the executable codes are executed by the one or more processors, the above method for monitoring the link state between nodes is implemented.

The embodiments of the present disclosure provides a computer readable storage medium storing programs thereon, wherein when the programs are executed by one or more processors, the above method for monitoring the link state between nodes is implemented.

According to the technical solutions provided by the embodiments of the present disclosure, when a bandwidth load of a ring network link is relatively high, a node can directly use a message received on a link as a link monitoring message without actively transmitting the link monitoring message, therefore, loads of the link can be effectively reduced, and the reliability of link state monitoring can be improved. In addition, when the bandwidth load of the ring network link is relatively low, the node can effectively monitor whether main processors of the link and the node are abnormal at the same time by actively transmitting the link state diagnosis message and making the message return after being processed by two nodes, thereby avoiding the false alarm of link detection caused by parallel characteristics of the processors.

The features and advantages of the present disclosure will be described in details by way of preferred embodiments with reference to the drawings.

BRIEF DESCRIPTION OF THE DRAWINGS

FIG. 3 is an interactive schematic diagram illustrating a method for monitoring a link state between nodes in a heavy-traffic data interactive state according to an embodiment of the present disclosure.

FIG. 4 is an interactive schematic diagram illustrating a method for monitoring a link state between nodes in a small-traffic data interactive state according to an embodiment of the present disclosure.

FIG. 5 is a schematic diagram illustrating a format of a link state diagnosis message according to an embodiment of the present disclosure.

DETAILED DESCRIPTION OF THE EMBODIMENTS

In order that the objectives, technical solutions and advantages of the present disclosure will become more apparent, the present disclosure will be described in more detail with reference to the drawings and examples above. It should be understood that the specific embodiments described herein are only for illustrating but not for limiting the scope of the present disclosure. Also, in the following description, descriptions of well-known structures and techniques are omitted to avoid unnecessarily obscuring the concepts of the present disclosure.

Figure 1:
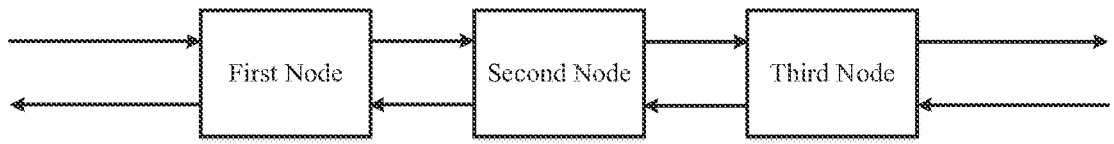
FIG. 1 is a node connection diagram of an application scenario according to an embodiment of the present disclosure.

FIG. 1 is a node connection diagram of an application scenario according to an embodiment of the present disclosure. As shown in FIG. 1, three nodes (for example, a first node, a second node and a third node) in a ring network system are sequentially interconnected by using network cables or optical fibers, and data in the ring network system is transmitted among the three nodes.

It should be noted that the first node, the second node and the third node can be any three nodes sequentially connected in the ring network system.

Figure 2:
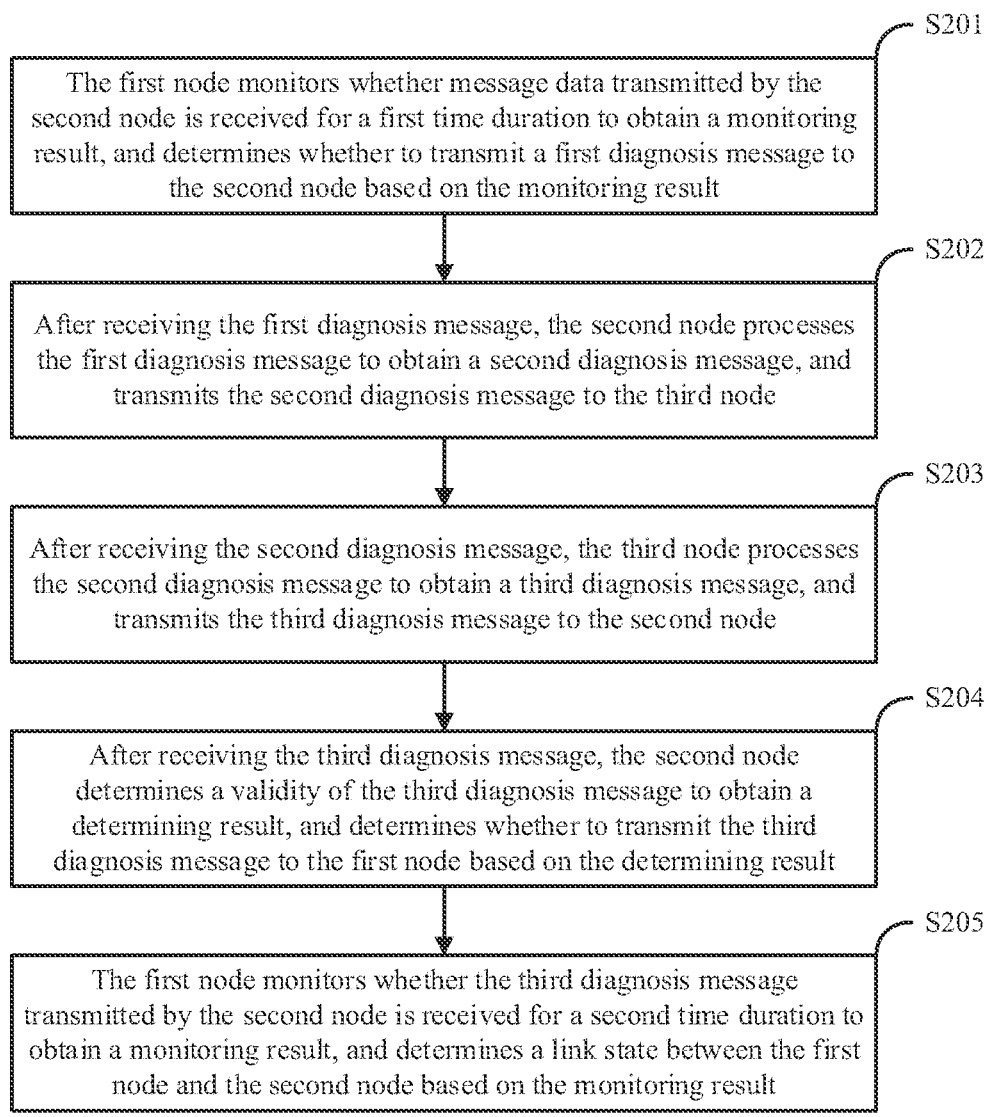
FIG. 2 is a flowchart illustrating a method for monitoring a link state between nodes according to an embodiment of the present disclosure.

FIG. 2 is a flowchart illustrating a method for monitoring a link state between nodes according to an embodiment of the present disclosure. The method for monitoring the link state between nodes in FIG. 2 can be applied to a ring network system, wherein the ring network system includes a first node, a second node and a third node connected in sequence. As shown in FIG. 2, the method includes:

S201, the first node monitors whether message data transmitted by the second node is received for a first time duration to obtain a monitoring result, and determines whether to transmit a first diagnosis message to the second node based on the monitoring result;

S202, after receiving the first diagnosis message, the second node processes the first diagnosis message to obtain a second diagnosis message, and transmits the second diagnosis message to the third node;

S203, after receiving the second diagnosis message, the third node processes the second diagnosis message to obtain a third diagnosis message, and transmits the third diagnosis message to the second node;

S204, after receiving the third diagnosis message, the second node determines a validity of the third diagnosis message to obtain a determining result, and determines whether to transmit the third diagnosis message to the first node based on the determining result;

S205, the first node monitors whether the third diagnosis message transmitted by the second node is received for a second time duration to obtain a monitoring result, and determines a link state between the first node and the second node based on the monitoring result.

According to the technical solutions provided by the embodiments of the present disclosure, when a bandwidth load of a ring network link is relatively high, a node can directly use a message received on a link as a link monitoring message without actively transmitting the link monitoring message, therefore, loads of the link can be effectively reduced, and the reliability of link state monitoring can be improved. In addition, when the bandwidth load of the ring network link is relatively low, the node can effectively monitor whether main processors of the link and the node are abnormal at the same time by actively transmitting the link state diagnosis message and making the message return after being processed by two nodes, thereby avoiding the false alarm of link detection caused by parallel characteristics of the processors.

In some embodiments, by the first node, monitoring whether message data transmitted by the second node is received for the first time duration includes: by the first node, in response to receiving message data for the first time duration, processing the message data and determining that the link state between the first node and the second node is normal; and in response to not receiving the message data for the first time duration, cumulatively calculating, by the first node, a first number of times that none message data is received.

In some embodiments, determining whether to transmit the first diagnosis message to the second node based on the monitoring result includes: determining, by the first node, whether the first number of times exceeds a first threshold; in response to the first number of times not exceeding the first threshold, continuously monitoring, by the first node, whether message data transmitted by the second node is received for the first time duration; and in response to the first number of times exceeding the first threshold, transmitting, by the first node, the first diagnosis message to the second node.

In some embodiments, the first diagnosis message at least includes a message command, a number of network ports for message passing through and a message transmission direction.

In some embodiments, by the second node, after receiving the first diagnosis message, processing the first diagnosis message to obtain the second diagnosis message, and transmitting the second diagnosis message to the third node includes: after receiving the first diagnosis message, determining, by the second node, whether the first diagnosis message is a link state diagnosis message based on the message command; in response to the first diagnosis message being the link state diagnosis message, determining, by the second node, whether the number of network ports for message passing through is 0 and whether the message transmission direction is 1; by the second node, in response to that the number of network ports for message passing through is 0 and the message transmission direction is 1, adding 1 to the number of network ports for message passing through, and keeping the message transmission direction at 1; and by the second node, repackaging the first diagnosis message to obtain the second diagnosis message, and transmitting the second diagnosis message to the third node.

In some embodiments, by the third node, after receiving the second diagnosis message, processing the second diagnosis message to obtain the third diagnosis message, and transmitting the third diagnosis message to the second node includes: after receiving the second diagnosis message, determining, by the third node, whether the second diagnosis message is a link state diagnosis message based on the message command; in response to the second diagnosis message being the link state diagnosis message, determining, by the third node, whether the number of network ports for message passing through is 1 and whether the message transmission direction is 1; by the third node, in response to that the number of network ports for message passing through is 1 and the message transmission direction is 1, adding 1 to the number of network ports for message passing through, and setting the message transmission direction to 0; and by the third node, repackaging the second diagnosis message to obtain the third diagnosis message, and transmitting the third diagnosis message to the second node.

In some embodiments, by the second node, after receiving the third diagnosis message, determining the validity of the third diagnosis message, and determining whether to transmit the third diagnosis message to the first node based on the determining result includes: after receiving the third diagnosis message, determining, by the second node, whether the third diagnosis message is a link state diagnosis message based on the message command; in response to the third diagnosis message being the link state diagnosis message, determining, by the second node, whether the number of network ports for message passing through is 2 and whether the message transmission direction is 0; and in response to that the number of network ports for message passing through is 2 and the message transmission direction is 0, determining, by the second node, the third diagnosis message is valid, and transmitting the third diagnosis message to the first node.

In some embodiments, by the first node, monitoring whether the third diagnosis message transmitted by the second node is received for the second time duration, and determining the link state between the first node and the second node based on the monitoring result includes: in response to receiving the third diagnosis message for the second time duration, determining, by the first node, that the link state between the first node and the second node is normal; and by the first node, in response to not receiving the third diagnosis message for the second time duration, cumulatively calculating a second number of times that none third diagnosis message is received, and determining the link state between the first node and the second node based on the second number of times.

In some embodiments, determining the link state between the first node and the second node based on the second number of times includes: determining, by the first node, whether the second number of times exceeds a second threshold; in response to the second number of times not exceeding the second threshold, transmitting, by the first node, the first diagnosis message to the second node; and in response to the second number of times exceeding the second threshold, determining, by the first node, that the link state between the first node and the second node is abnormal.

In some embodiments, the message data includes any valid network data.

In some embodiments, the second time duration is a time period from the first node transmitting the first diagnosis message until to the first node receiving the third diagnosis message.

FIG. 3 is an interactive schematic diagram illustrating a method for monitoring a link state between nodes in a heavy-traffic data interactive state according to an embodiment of the present disclosure. As shown in FIG. 3, in the heavy-traffic data interactive state, nodes in a ring network system frequently interact with each other. A first node monitors message data transmitted by a second node for a first time duration, when the message data is monitored, the first node determines that a link between the first node and the second node is in a normal communication state (that is, a link state is normal), and adjusts a first time duration counter to start counting from zero.

Here, the message data can be any valid network data. The first time duration can be a preset time duration. In general, the preset time duration is in a range of 5 ms to 10 ms, and preferably, the first time duration is 5 ms.

FIG. 4 is an interactive schematic diagram illustrating a method for monitoring a link state between nodes in a small-traffic data interactive state according to an embodiment of the present disclosure. As shown in FIG. 4, in the small-traffic data interactive state, nodes in a ring network system will not interact with each other for a certain period of time. If any message data transmitted by a second node is not monitored for M consecutive first time durations, a first node transmits a link state diagnosis message to the second node. Here, M can be a preset value, and preferably, M is 10. A format of the link state diagnosis message can be shown in FIG. 5, and the link state diagnosis message can include a message command (CMD), a number of network ports for message passing through (PORT_NUM) and a message transmission direction (TRANS_FLAG).

It should be noted that in the link state diagnosis message transmitted by the first node, an initial value of the number of network ports for message passing through is 0, and an initial value of the message transmission direction is 1.

After transmitting the link state diagnosis message to the second node, the first node monitors whether the link state diagnosis message returned by the second node is received for a second time duration. Here, the second time duration can be a time period from the first node transmitting the link state diagnosis message to the second node to the first node receiving the link state diagnosis message returned by the second node. If the link state diagnosis message with number of network ports for message passing through of 2 and the message transmission direction of 0 is received, it is determined that the link between the first node and the second node is in a normal communication state, and the second node works normally. At this time, a second time duration counter is cleared, and the first node re-monitors the message data transmitted by the second node for the first time duration.

Figure 6:
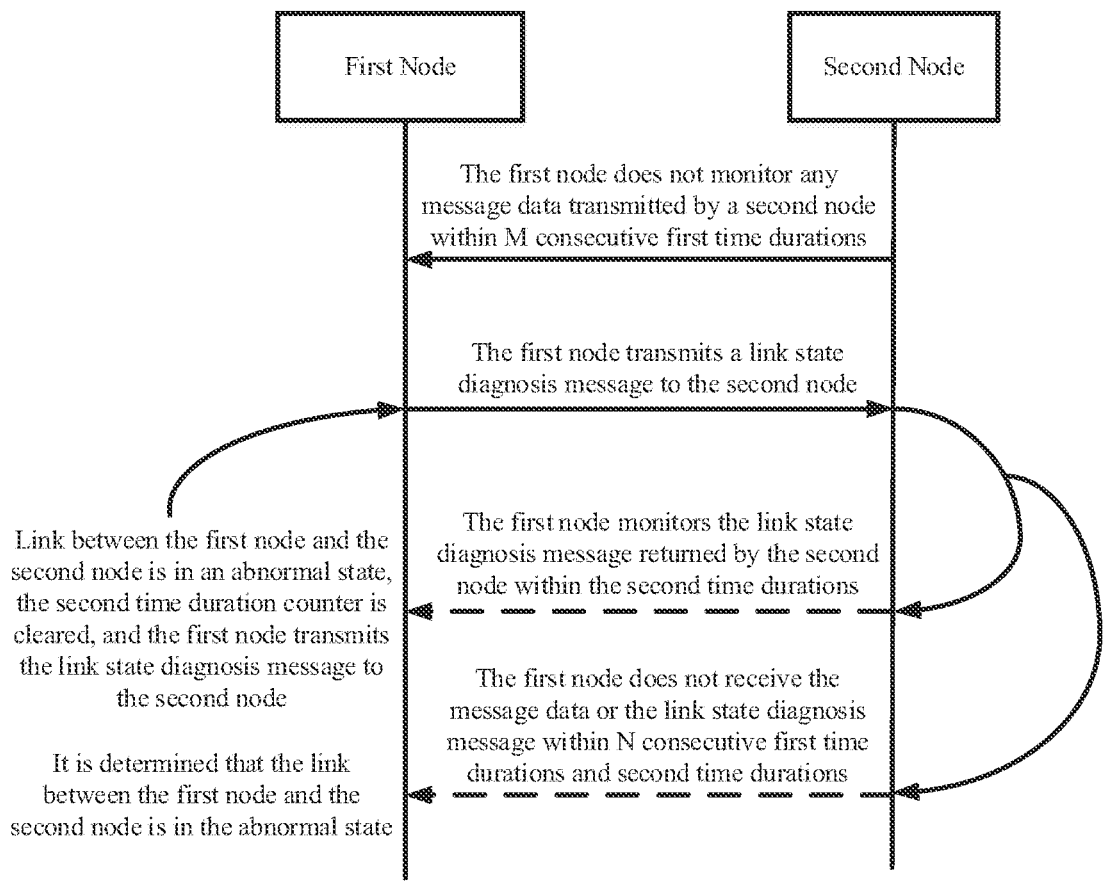
FIG. 6 is an interactive schematic diagram illustrating a method for monitoring a link state between nodes in a link abnormal state according to an embodiment of the present disclosure.

FIG. 6 is an interactive schematic diagram illustrating a method for monitoring a link state between nodes in a link abnormal state according to an embodiment of the present disclosure. As shown in FIG. 6, in the case that a link between a first node and a second node is abnormal or the second node fails, if the first node does not monitor a link state diagnosis message returned by the second node for a second time duration, it is determined that the link between the first node and the second node is in an abnormal state (that is, the link state is abnormal), at this time, a second time duration counter is cleared, and the first node transmits the link state diagnosis message to the second node again; and if the first node does not receive the message data or the link state diagnosis message for N consecutive first time durations or second time durations, it is determined that the link between the first node and the second node is in the abnormal state. Here, N can be a preset value, and preferably, N is 20.

Figure 7:
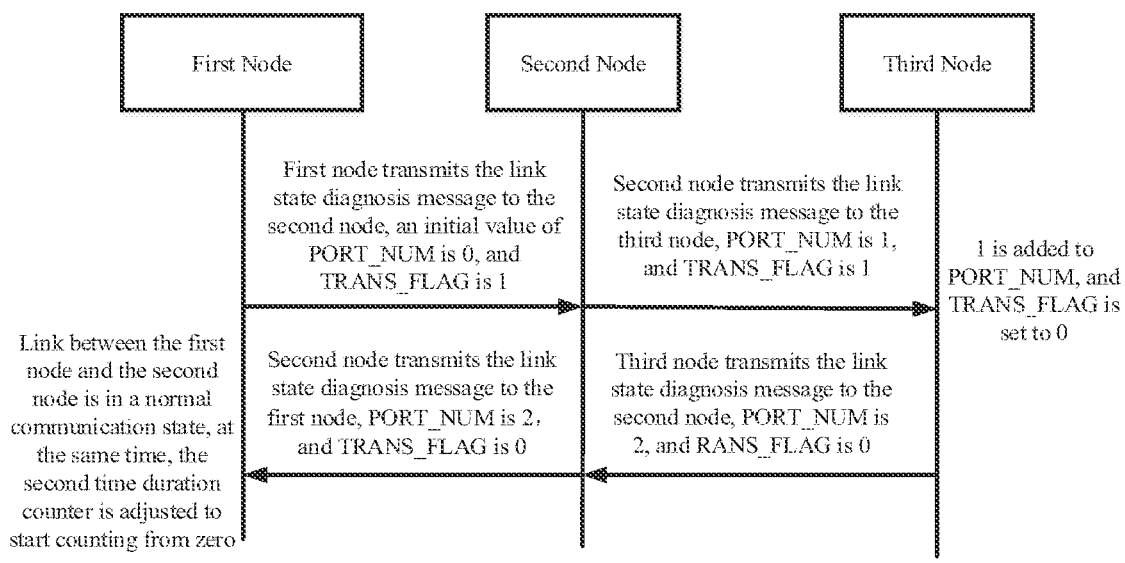
FIG. 7 is an interactive schematic diagram illustrating a transmission of a link state diagnosis message between nodes according to an embodiment of the present disclosure.

FIG. 7 is an interactive schematic diagram illustrating a transmission of a link state diagnosis message between nodes according to an embodiment of the present disclosure. As shown in FIG. 7, a first node monitors whether message data transmitted by a second node is received for a first time, if the message data is not received, the first node cumulatively calculates a first number of times that the message data is not received, and transmits a first diagnosis message to a first network port of the second node when the first number of times exceeds a first threshold. Here, the first diagnosis message at least includes a message command, a number of network ports for message passing through and a message transmission direction, and an initial value of the number of network ports for message passing through is 0, and an initial value of the message transmission direction is 1.

After receiving the first diagnosis message, the second node determines whether the first diagnosis message is a link state diagnosis message according to the message command; if the first diagnosis message is the link state diagnosis message, the second node further determines whether the number of network ports for message passing through is 0 and whether the message transmission direction is 1; if the number of network ports for message passing through is 0 and the message transmission direction is 1, the second node adds 1 to the number of network ports for message passing through and keeps the message transmission direction at 1; and if the number of network ports for message passing through is not 0 and/or the message transmission direction is not 1, the second node determines that the first diagnosis message is an invalid link state diagnosis message and performs an invalid message processing; further, the second node repackages the first diagnosis message to obtain a second diagnosis message, and transmits the second diagnosis message to a third node via a second network port of the second node.

After receiving the second diagnosis message, the third node determines whether the second diagnosis message is a link state diagnosis message based on the message command; if the second diagnosis message is the link state diagnosis message, the third node further determines whether the number of network ports for message passing through is 1 and whether the message transmission direction is 1; if the number of network ports for message passing through is 1 and the message transmission direction is 1, the third node adds 1 to the number of network ports for message passing through and sets the message transmission direction to 0; and if the number of network ports for message passing through is not 1 and the message transmission direction is not 1, the third node determines that the second diagnosis message is the invalid link state diagnosis message and performs the invalid message processing; further, the third node repackages the second diagnosis message to obtain a third diagnosis message, and transmits the third diagnosis message to the second node.

After receiving the third diagnosis message, the second node determines whether the third diagnosis message is a link state diagnosis message based on the message command; if the third diagnosis message is the link state diagnosis message, the second node further determines whether the number of network ports for message passing through is 2 and whether the message transmission direction is 0; if the number of network ports for message passing through is 2 and the message transmission direction is 0, the second node directly transmits the third diagnosis message to the first node via the first network port; and if the number of network ports for message passing through is not 2 and/or the message transmission direction is not 0, the second node determines that the third diagnosis message is the invalid link state diagnosis message and performs the invalid message processing.

The first node monitors whether the third diagnosis message transmitted by the second node is received for a second time duration, if the third diagnosis message is received for the second time duration, the first node determines that the link between the first node and the second node is in a normal communication state, at this time, a second time duration counter is adjusted to start counting from zero.

Figure 8:
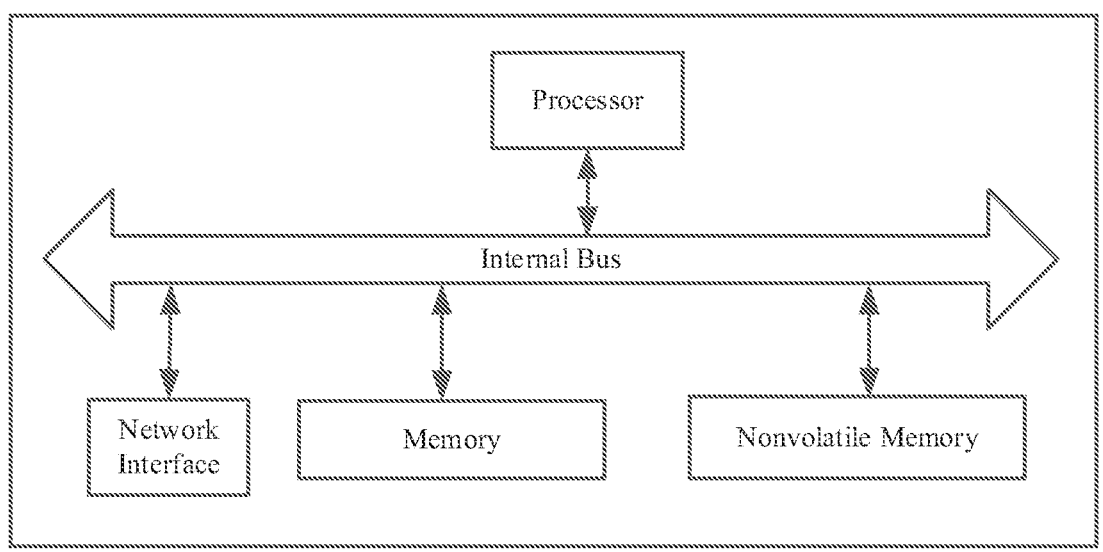
FIG. 8 is a schematic structure diagram illustrating an apparatus for monitoring a link state between nodes according to an embodiment of the present disclosure.

The embodiments of the apparatus for monitoring the link state between nodes of the present disclosure can be applied to any device with data processing capability, which can be a device or an apparatus such as a computer. The embodiments of the apparatus can be implemented by software, or by hardware or a combination of software and hardware. Taking software implementation as an example, as an apparatus in a logical sense, it is formed by reading the corresponding computer program instructions in the non-volatile memory into the memory through the processor of any device with data processing capability where it is located. In terms of hardware, as shown in FIG. 8, FIG. 8 is a hardware structure diagram illustrating any device with data processing capability where an apparatus for monitoring a link state between nodes according to the embodiments of the present disclosure is located. In addition to a processor, a memory, a network interface and a nonvolatile memory shown in FIG. 8, any device with data processing capability in which the apparatus is located in the embodiments may generally include other hardware according to the actual functions of any device with data processing capability, details of which will not be described herein. The implementation of the functions and effects of each module in the above apparatus may refer to the implementation of the corresponding steps in the foregoing method, and detail is not described herein again.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

The embodiments of the present disclosure provides a computer readable storage medium storing programs thereon, wherein when the programs are executed by one or more processors, the method for monitoring the link state between nodes described in any one of the above embodiments is implemented.

The computer readable storage medium can be an internal storage unit of any device with data processing capability described in any one of the foregoing embodiments, for example, a hard disk or a memory. Alternatively, the computer readable storage medium can be an external storage device of any device with data processing capability, for example, a plug-in hard disk, a smart media card (SMC), a secure digital (SD) card, a flash card, or the like that is configured on the device. Further, the computer readable storage medium can include both an internal storage unit and an external storage device of any device with data processing capability. The computer readable storage medium is configured to store the computer program and other programs and data that are required by any device with data processing capability. The computer readable storage medium can be further configured to temporarily store data that has been output or is to be output.

The above are only preferred examples of the present disclosure, and are not intended to limit the present disclosure. Any modification, equivalent replacement, or improvement made within the spirit and principles of the present disclosure shall be included in the protection scope of the present disclosure.

The invention claimed is:

1. A method for monitoring a link state between nodes, being applicable to a ring network system, wherein the ring network system comprises a first node, a second node and a third node which are sequentially connected, the method comprising:
by the first node, monitoring whether message data transmitted by the second node is received for a first time duration to obtain a monitoring result, and determining whether to transmit a first diagnosis message to the second node based on the monitoring result comprises:
in response to not monitoring the message data transmitted by the second node for M consecutive first time durations, transmitting, by the first node, the first diagnosis message to the second node, wherein M is a preset value;
by the second node, after receiving the first diagnosis message, processing the first diagnosis message to obtain a second diagnosis message, and transmitting the second diagnosis message to the third node;
by the third node, after receiving the second diagnosis message, processing the second diagnosis message to obtain a third diagnosis message, and transmitting the third diagnosis message to the second node;
by the second node, after receiving the third diagnosis message, determining a validity of the third diagnosis message to obtain a determining result, and determining whether to transmit the third diagnosis message to the first node based on the determining result; and
by the first node, monitoring whether the third diagnosis message transmitted by the second node is received for a second time duration to obtain a monitoring result, and determining a link state between the first node and the second node based on the monitoring result.

2. The method according to claim 1, wherein, by the first node, monitoring whether message data transmitted by the second node is received for the first time duration comprises:
by the first node, in response to receiving message data for the first time duration, processing the message data and determining that the link state between the first node and the second node is normal; and
in response to not receiving the message data for the first time duration, cumulatively calculating, by the first node, a first number of times that none message data is received.

3. The method according to claim 2, wherein determining whether to transmit the first diagnosis message to the second node based on the monitoring result comprises:
determining, by the first node, whether the first number of times exceeds a first threshold;
in response to the first number of times not exceeding the first threshold, continuously monitoring, by the first node, whether message data transmitted by the second node is received for the first time duration; and
in response to the first number of times exceeding the first threshold, transmitting, by the first node, the first diagnosis message to the second node.

4. The method according to claim 1, wherein the first diagnosis message at least comprises a message command, a number of network ports for message passing through and a message transmission direction.

5. The method according to claim 4, wherein, by the second node, after receiving the first diagnosis message, processing the first diagnosis message to obtain the second diagnosis message, and transmitting the second diagnosis message to the third node comprises:
after receiving the first diagnosis message, determining, by the second node, whether the first diagnosis message is a link state diagnosis message based on the message command;
in response to the first diagnosis message being the link state diagnosis message, determining, by the second node, whether the number of network ports for message passing through is 0 and whether the message transmission direction is 1;
by the second node, in response to that the number of network ports for message passing through is 0 and the message transmission direction is 1, adding 1 to the number of network ports for message passing through, and keeping the message transmission direction at 1; and
by the second node, repackaging the first diagnosis message to obtain the second diagnosis message, and transmitting the second diagnosis message to the third node.

6. The method according to claim 4, wherein, by the third node, after receiving the second diagnosis message, processing the second diagnosis message to obtain the third diagnosis message, and transmitting the third diagnosis message to the second node comprises:
after receiving the second diagnosis message, determining, by the third node, whether the second diagnosis message is a link state diagnosis message based on the message command;
in response to the second diagnosis message being the link state diagnosis message, determining, by the third node, whether the number of network ports for message passing through is 1 and whether the message transmission direction is 1;
by the third node, in response to that the number of network ports for message passing through is 1 and the message transmission direction is 1, adding 1 to the number of network ports for message passing through, and setting the message transmission direction to 0; and
by the third node, repackaging the second diagnosis message to obtain the third diagnosis message, and transmitting the third diagnosis message to the second node.

7. The method according to claim 4, wherein, by the second node, after receiving the third diagnosis message, determining the validity of the third diagnosis message, and determining whether to transmit the third diagnosis message to the first node based on the determining result comprises:
after receiving the third diagnosis message, determining, by the second node, whether the third diagnosis message is a link state diagnosis message based on the message command;
in response to the third diagnosis message being the link state diagnosis message, determining, by the second node, whether the number of network ports for message passing through is 2 and whether the message transmission direction is 0; and
in response to that the number of network ports for message passing through is 2 and the message transmission direction is 0, determining, by the second node, the third diagnosis message is valid, and transmitting the third diagnosis message to the first node.

8. The method according to claim 1, wherein, by the first node, monitoring whether the third diagnosis message transmitted by the second node is received for the second time duration, and determining the link state between the first node and the second node based on the monitoring result comprises:

in response to receiving the third diagnosis message for the second time duration, determining, by the first node, that the link state between the first node and the second node is normal; and by the first node, in response to not receiving the third diagnosis message for the second time duration, cumulatively calculating a second number of times that none third diagnosis message is received, and determining the link state between the first node and the second node based on the second number of times.

9. The method according to claim 8, wherein determining the link state between the first node and the second node based on the second number of times comprises:

determining, by the first node, whether the second number of times exceeds a second threshold;

in response to the second number of times not exceeding the second threshold, transmitting, by the first node, the first diagnosis message to the second node; and in response to the second number of times exceeding the second threshold, determining, by the first node, that the link state between the first node and the second node is abnormal.

10. The method according to claim 1, wherein the message data comprises any valid network data.

11. The method according to claim 1, wherein the second time duration is a time period from the first node transmitting the first diagnosis message until to the first node receiving the third diagnosis message.

12. A system for monitoring a link state between nodes, wherein the system comprises a first node, a second node and a third node which are sequentially connected, wherein the first node is configured to: monitor whether message data transmitted by the second node is received for a first time duration to obtain a monitoring result, and determine whether to transmit a first diagnosis message to the second node based on the monitoring result; wherein the first node is further configured to in response to not monitoring the message data transmitted by the second node for M consecutive first time durations, transmit the first diagnosis message to the second node, wherein M is a preset value;

the second node is configured to: after receiving the first diagnosis message, process the first diagnosis message to obtain a second diagnosis message, and transmit the second diagnosis message to the third node;

the third node is configured to: after receiving the second diagnosis message, process the second diagnosis message to obtain a third diagnosis message, and transmit the third diagnosis message to the second node;

the second node is further configured to: after receiving the third diagnosis message, determine a validity of the third diagnosis message to obtain a determining result, and determine whether to transmit the third diagnosis message to the first node based on the determining result; and the first node is further configured to: monitor whether the third diagnosis message transmitted by the second node is received for a second time duration to obtain a monitoring result, and determine a link state between the first node and the second node based on the monitoring result.

* * * * *